R. E. BILLINGSLEY.
ROTARY PLOW.
APPLICATION FILED FEB. 2, 1920.
1,389,484.
Patented Aug. 30, 1921.
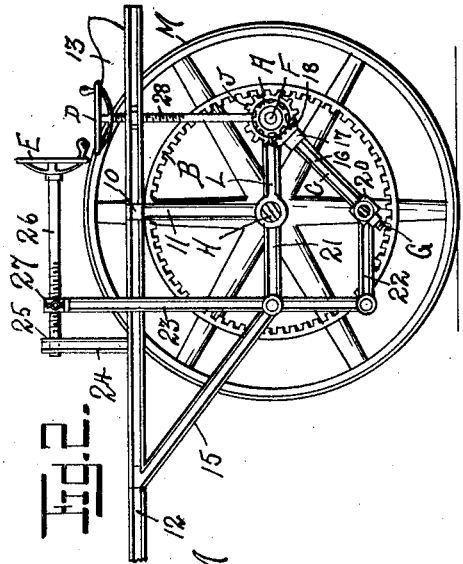
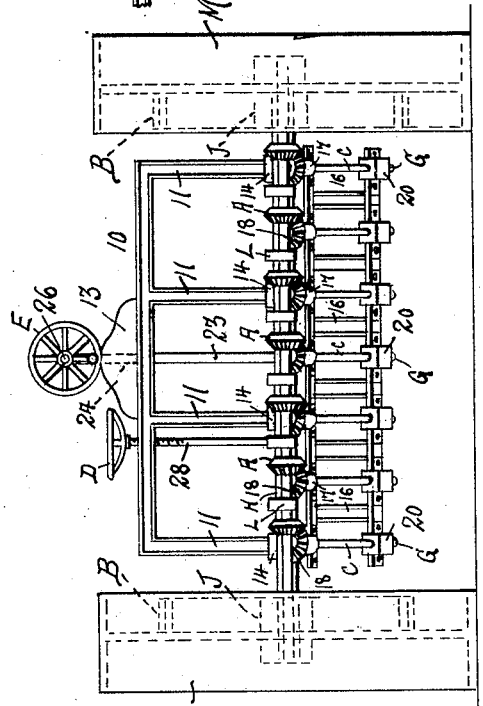
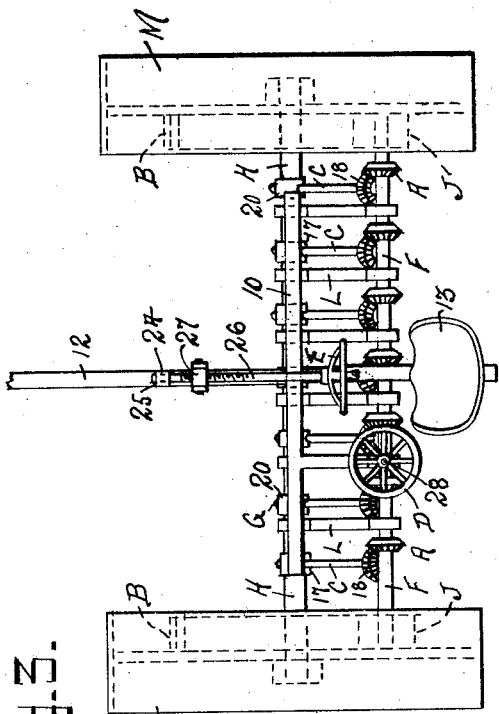
R. E. BILLINGSLEY, Inventor
By Geo. P. Kimmel
Attorney

UNITED STATES PATENT OFFICE.

RENNIE E. BILLINGSLEY, OF SAN ANTONIO, TEXAS.

ROTARY PLOW.

1,389,484.　　　　　Specification of Letters Patent.　　Patented Aug. 30, 1921.

Application filed February 2, 1920. Serial No. 355,753.

*To all whom it may concern:*

Be it known that I, RENNIE E. BILLINGSLEY, a citizen of the United States, residing at San Antonio, in the county of Bexar and State of Texas, have invented certain new and useful Improvements in Rotary Plows, of which the following is a specification.

This invention relates to improvements in rotary plows, and has for one of its objects to provide a device of this character whereby a plurality of rotary plows may be simultaneously operated and adjusted to operate at any required depth, or elevated entirely above the ground when not in use or when being transported.

With these and other objects in view, the invention consists in certain novel features of construction as hereinafter shown and described and then specifically pointed out in the claims, and in the drawings illustrative of the preferred embodiment of the invention.

Figure 1 is a side elevation with the right wheel removed.

Fig. 2 is a rear elevation.

Fig. 3 is a plan view.

The improved device comprises an axle H, supporting traction wheels M, each wheel having an internal ring gear B. Supported upon the axle H between the traction wheels is an arched frame including a horizontal member 10 and a plurality of vertical members 11 the latter coupled at their lower ends at 14 to the axle. The portion 10 of the frame carries a draft tongue, a portion of which is represented at 12.

The seat 13 is attached in any suitable manner to the frame 11.

Mounted to swing upon the axle H are a plurality of lever arms L extending rearwardly and connected at their rear ends to a shaft F.

Mounted to swing at one end upon the shaft are a plurality of bars 16, the latter carrying bearings 17 at the upper ends in which obliquely rotative shafts C are rotatably engaged. At their upper ends the shafts C are provided with bevel gears 18 which mesh with similar bevel gears A on the shaft F.

The shaft F extends at its ends into the wheels M and is provided with pinions J which engage the ring gears B.

By this means the rotary motion of the traction wheels B are communicated to the obliquely directed shafts C.

At their lower and forward ends the shafts C are threaded as shown at G, and designed to support rotary plow members, not shown. The plow member constitutes the subject matter of another application.

The shafts C are arranged to operate in bearings 20 which are connected to the bars 16 as shown in Fig. 2.

Extending forwardly of the axle H is an arm 21, and extending forwardly of one of the bars 16, is another arm 22, a brace 15 connecting the arm 21 with the frame.

Pivoted to the arm 21 at its forward end is a lever arm 23, the latter pivoted at its lower end to the arm 22.

Rising from the frame 11 is a standard 24, and connected at 25 to the standard is a threaded rod 26.

The rod 26 operates in a nut 27 carried by the lever 23.

At its rear end the rod 26 is provided with an operating wheel E, convenient to the driver on the seat 13.

Mounted for rotation on the frame is an adjusting screw 28 having an operating wheel D at its upper end and connected at its lower end to the shaft F.

By actuating the wheel E the bars 22 and 23 are operated to elevate and depress the lower forward ends of the bars 16 and shafts C to control the depth of cut of the plow elements, and by actuating the wheel D, the shaft F and its attachments will be elevated and depressed to control the angle at which the plows operate.

The operation of the rod 26 also enables the plows to be elevated entirely clear of the ground when the apparatus is to be transported.

Any required number of the bars 16 and shafts C may be employed.

By this arrangement as the apparatus is drawn over the ground, the motion of the wheels M is communicated to the shafts C and the latter together with the plow elements carried thereby rapidly rotated, as they move through the ground.

By this arrangement there is produced a simple and efficient rotary gang plow supporting apparatus and which, due to the mounting of various elements, can be moved over a field or other surface with but little tractive force; this operation resulting, primarily, from the manner in which the earth working elements are mounted and disposed with relation to the earth engaged thereby.

What is claimed is:

1. In an apparatus of the class described, a supporting frame mounted upon an axle with traction wheels carried by the axle, a plurality of arms swinging upon said axle, a plurality of bars swinging at one end thereof relative to said arms and adapted to support plow elements, means for causing the arms to swing upon the axle to control the angle of cut of the plow elements, and means for elevating and depressing the plow element carrying terminals of the bars.

2. In an apparatus of the class described, a supporting frame mounted upon an axle with traction wheels carried by the axle, a plurality of arms swinging upon said axle, a plurality of bars swinging at one end thereof relative to said arms, a shaft supported in each bar, means for causing the arms to swing upon the axle to control the angle of cut of the plow elements, and means for elevating and depressing the plow element carrying terminals of the bars.

3. In an apparatus of the class described, a supporting frame mounted upon an axle with traction wheels carried by the axle, a plurality of arms swinging upon said axle, a plurality of bars swinging at one end thereof relative to said arms, a shaft supported in each bar and adapted to support plow elements, means for transmitting the motion of said traction wheels to said shafts, means for causing the arms to swing upon the axle to control the angle of cut of the plow elements, and means for elevating and depressing the plow element carrying terminals of the bars.

4. In an apparatus of the class described, a supporting frame mounted upon an axle with traction wheels carried by the axle, a plurality of arms swinging upon said axle, a plurality of bars swinging at one end thereof relative to said arms, and adapted to support plow elements; means for causing the arms to swing upon the axle, a standard rising from the frame, a threaded rod supported by said standard, a lever arm swingingly supported from said frame and carrying a nut device engaged by said rod, and a link device coupling the lever to the plow carrying element.

5. In an apparatus of the class described, a supporting frame mounted upon an axle with traction wheels carried by the axle, a plurality of arms swinging upon said axle, a plurality of bars swinging at one end thereof relative to said arms and adapted to support plow elements, means for coupling said plow carrying elements at their free ends, a standard rising from the frame, a threaded rod supported by said standard, a lever arm swingingly supported from said frame and carrying a nut device engaged by said rod, and a link device coupling the lever to the coupling means of the plow carrying elements.

In testimony whereof, I affix my signature hereto.

RENNIE E. BILLINGSLEY.